United States Patent [19]
Habib

[11] Patent Number: 6,035,368
[45] Date of Patent: Mar. 7, 2000

[54] PROTECTION METHOD AGAINST EEPROM-DIRECTED INTRUSION INTO A MOBILE COMMUNICATION DEVICE THAT HAS A PROCESSOR, AND A DEVICE HAVING SUCH PROTECTION MECHANISM

[75] Inventor: Elia N. Habib, Le Mans, France

[73] Assignee: U.S. Philips Corporation, New York, N.Y.

[21] Appl. No.: 08/966,224

[22] Filed: Nov. 7, 1997

[30] Foreign Application Priority Data

Nov. 15, 1996 [EP] European Pat. Off. ............... 96402457

[51] Int. Cl.⁷ ............................................ G06F 12/14
[52] U.S. Cl. ............................................ 711/103; 711/163
[58] Field of Search .................... 711/103, 163; 713/200, 300, 330, 340; 365/195, 226

[56] References Cited

U.S. PATENT DOCUMENTS

| | | | |
|---|---|---|---|
| 4,584,665 | 4/1986 | Vrielink | 364/918 |
| 5,465,341 | 11/1995 | Doi et al. | 364/918.7 |
| 5,594,686 | 1/1997 | Hazen et al. | 365/185.04 |
| 5,680,581 | 10/1997 | Banno et al. | 711/163 |
| 5,687,654 | 11/1997 | Koo | 711/163 |
| 5,787,040 | 7/1998 | Leon et al. | 365/189.01 |
| 5,787,704 | 7/1998 | Sanemitsu | 711/164 |
| 5,809,544 | 9/1998 | Dorsey et al. | 711/163 |
| 5,812,662 | 9/1998 | Hsu et al. | 380/4 |
| 5,848,435 | 12/1998 | Brant et al. | 711/152 |

*Primary Examiner*—John W. Cabeca
*Assistant Examiner*—Christopher S. Chow

[57] ABSTRACT

A method for protecting against EEPROM-directed intrusion into a mobile communication device by an external interfacing master in which an incipient powering operation of the device is detected. The mobile communication device carries an EEPROM and a microprocessor that are interconnected via an electrical interface. The microprocessor detects whether the external interfacing master tries to fraudulently access the EEPROM through the electrical interface. Upon such a detection, the microprocessor undertakes a protecting measure for blocking subsequent reading of the EEPROM by the external interfacing master.

12 Claims, 1 Drawing Sheet

6,035,368

PROTECTION METHOD AGAINST EEPROM-DIRECTED INTRUSION INTO A MOBILE COMMUNICATION DEVICE THAT HAS A PROCESSOR, AND A DEVICE HAVING SUCH PROTECTION MECHANISM

BACKGROUND OF THE INVENTION

The invention relates to a method for protecting against EEPROM-directed intrusion into a mobile communication device that carries EEPROM memory means and processor means that are interconnected via an electrical interface. A foremost, although not limitative embodiment of such a mobile communication device is a portable telephone. Billing by the telephone authority of a particular person for the costs of the communication is often based on an identifier that is stored within the device in an EEPROM module. This usage of an EEPROM allows the personalizing of the device immediately before issuing it to a holder. Such devices are rendered further unique through storing additional information, such as an Electronic Serial Number. Other such communication devices could be used for acquiring a particular service from a service rendering authority, such as a data bank. In consequence, fraudulent persons have found it advantageous to copy such identifier, and possibly other such informations from the EEPROM of a particular communication device into an other communication device, generally one with identical hardware. In particular, the costs to a user are in particular due to the service rendered, rather than to the hardware. Now, the copying of the EEPROM might be rendered unfeasible by having the EEPROM outputting informations only after an appropriate encryption. However, the present invention recognizes that such devices must by necessity be very inexpensive, and therefore the manufacturing process will produce large series of identical devices that could have various different identifiers and ESN's, but always would have identical encryption mechanisms. This means that copying all information would still lead to an apparently lawful device. The storing of a unique key in the EEPROM itself would be insecure, inasmuch as it would be possible for a fraudulent person to overwrite this key with new, and known information.

SUMMARY OF THE INVENTION

Therefore, a need exists for, on the level of a complete device, rendering the copying unfeasible. Now, according to one of its aspects, the invention is characterized in that said method comprises the steps of:

detecting an incipient powering operation of said device;
through said microprocessor means detecting an external interfacing master;
upon said detecting, undertaking by said microprocessor means a protecting measure for blocking subsequent reading of said EEPROM means by said external interfacing master.

The invention is based on having the microprocessor detecting the power-up situation, in combination with the appearance of an external master on the interface. Under standard operating conditions, the master station of the interface should be the microprocessor itself. Presence of any other master station would therefore signal an impending fraud.

The protection measure may have various different realizations. A first one is by letting the microprocessor initiate a powering down routine. This would immediately mute the on-board EEPROM. A second measure is to block the interface operation through one or more appropriate voltage or current levels. For example, clamping a bus clock line to ground voltage would render all bus transfer impossible. Likewise, by simulating a raised or lowered clock frequency, the operation of the interface could come out completely garbled. Similar measures may be taken viz a viz a data or control line. A third measure is to simulate erroneous EEPROM data or addresses through the microprocessor. For example, the EEPROM may be constructed to implement a small delay before sending out requested data. If the microprocessor would answer earlier, the external listener would assume erroneous information. In the same way, the microprocessor may insert an erroneous read address to the EEPROM, thereby causing the latter to output information not intended by the external listener. A fourth measure is to amend EEPROM-transmitted information through a scrambling procedure, for example by superposing extra information, when the bus data line has an internal AND-functionality. It is clear from the above, that the detecting by the external listener of actual blocking ensues various levels of complexity. Moreover, the device can be programmed to take more than one of the above four measures in alternation or in succession. This will further complicate any counter-measures by the prospective fraud.

The invention also relates to a mobile communication device provided with a protecting mechanism against EEPROM-directed intrusion into the device that carries EEPROM memory means and processor means, according to the above.

Further advantageous aspects of the invention are recited in dependent claims.

BRIEF DESCRIPTION OF THE DRAWING

These and other aspects and advantages of the invention will be discussed more in detail hereinafter with reference to the detailed disclosure of preferred embodiments, and more in particular with reference to the appended Figures that show.

DETAILED DESCRIPTION OF PREFERRED EMBODIMENTS

Figure 1:
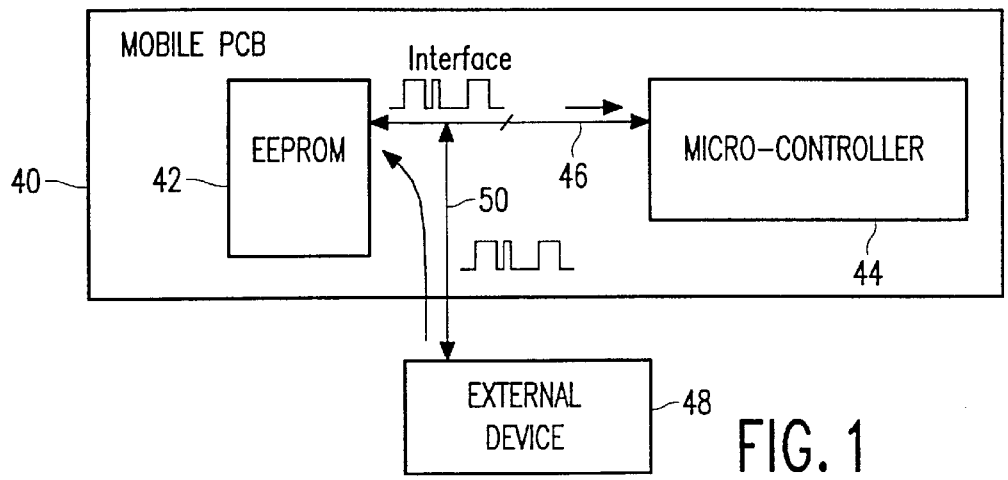
FIG. 1, a mobile communication device according to the invention.

FIG. 1 shows a mobile communication device according to the invention. The housing 40 comprises an EEPROM 42, that is used for storing information that may not be available at initial manufacturing, but must be stored later on. Examples thereof have been given hereabove. The EEPROM is interfaced to microcontroller or microprocessor 44 via an electrical interface 46. The latter may be configured as an I2C two-wire bus, according to U.S. Pat. No. 4,689,740 assigned to the present assignee. Of course, other configurations are feasible as well, such as incorporating a memory enable line next to data, clock, and address lines into the serial or parallel bus configuration. The device may have the functionality of a mobile telephone device and thus be provided with on-board RAM, serial wireless or IR I/O to the outside world, keyboard, and other features, that are interconnected to the processor 44 in a manner that is common in the art and need no further disclosure for the skilled-art person. Also the antenna functionality is widely known. Alternatively, the device may be used in close proximity, even in immediate contact with the other communicating device, for eliciting the latter to provide various services, such as the handing out of paper money, or the giving of information, for which a user should be billed on some remote credit account. Generally, the hardware parts of the device recited thus far are standard, and would need no further disclosure.

A fraudulent person may now wish to produce an identical copy of the device EEPROM for acquiring the services of the authority in question, whilst letting the registree of the original device pay for those services. Thereto, by means of appropriate attaching mechanism 50, external spy device 48 is connected to interface 46 for addressing and reading the required information from EEPROM 42. Symbolically, actual and identical information patterns have been indicated on both the central interface, and on the attaching mechanism 50. However, a particular aspect of these portable devices is that they are normally in a low-power state. Therefore, in some way or another, the device must be activated, which can be done by striking an arbitrary key of the device, so that an internal facility of the device is connected through or activated, or by connecting an external power facility not shown. This renders both the microprocessor and the EEPROM active. Then, the external device 48 is made to generate one or more read cycles on interface 46 with respect to EEPROM 42, so that the intended memory locations can be read-out. Subsequently, the copy device can be loaded with the information, therewith creating an identical copy. In certain situations, not all copied material need be identical, provided that the discrepancy goes unnoticed in later use.

Figure 2:
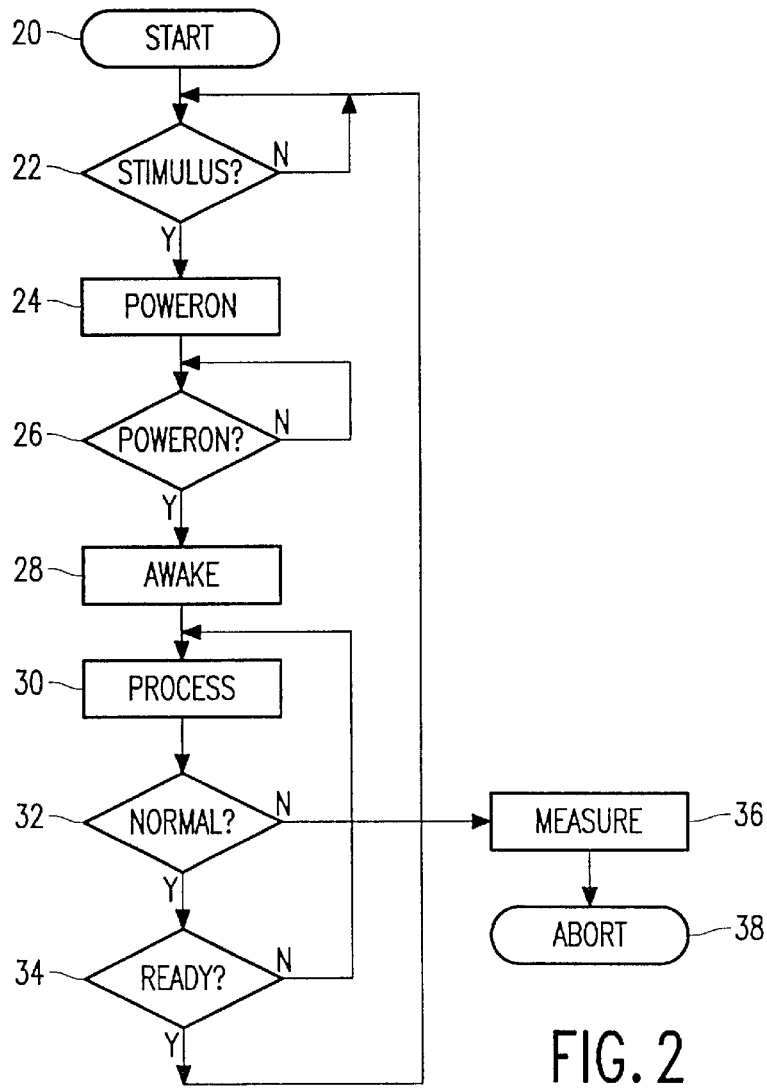
FIG. 2, a procedure flowchart for the invention.

FIG. 2 is a procedure flowchart for use with the invention. Block 20 represents the normal standby condition of the device, which means that the power level is low, and that only a limited subset of all available operations can be executed. Often, most of the little standby functionality pertains to detecting either a user keystroke or an incoming telephone call. If in block 22 such a stimulus is detected, the power is raised to standard level in block 24. Otherwise, a waiting loop is entered until a new detection is effected in block 22. In block 26, sufficiency of the power level is detected. If not, a waiting loop is executed. This procedure may take a small fraction of a second. If the power is sufficient, in block 28 the measures are taken that are necessary for attaining full processing functionality. In block 30 the processing is then executed. For brevity, no full explanation thereof is given. As regards the interface, the processor may generate addresses and read commands for the EEPROM, and upon such command, receive EEPROM data. In block 32, a check is executed to see whether the information format from the EEPROM corresponds to expectation. If aright, in block 34 it is detected whether the functionality process has terminated. In practice, the user may have terminated a telephone call, without for some time, say one minute, undertaking a further one. If so, the system goes back to the waiting loop of block 22. Otherwise, the process goes on in block 30. If, in block 32, an abnormal situation has been recognized, the system goes to block 36, wherein a countermeasure is taken, and subsequently aborts to block 38. The countermeasure may be permanent or temporary, such as for the duration of one hour, or may only prevail as long as unwanted interference is felt.

The detection of the interference may reside in that EEPROM data is received without a read command immediately preceding, thereby revealing that another interface or bus master station exists with respect to the EEPROM. In principle, another bus master could exist with respect to other types of interface communication, such as wireless to-RAM. In such case, the detector must distinguish between wanted and unwanted masters. One possibility is that the first master station must be the microprocessor itself, and any subsequent master must conform to certain requirements in time as set by the master, to which the external master station cannot obey. As said earlier, the countermeasure taken may be various.

A first realization of blocking the EEPROM reading is to power down the device, so that no further read operation is possible in the EEPROM. This may be done by opening a power switch not shown in the power control module while at the same time clamping down EEPROM power by an appropriate interconnection: the latter measure also blocks the applying of external power to the EEPROM. The applying of a reduced power level to a standby part of the processor is standard technology.

A second realization is to block the overall functionality of the interface by applying appropriate electrical voltages or currents, or by appropriate patterns thereof. For example, an I2C bus wire may be clamped by a clamping resistor. Clamping the clock wire will block the transport of information. Clamping the data wire will block the transport of any meaningful information. Also particular voltage patterns may be imposed on the data wire, such as a hold pattern that will hold all bus transfer for an undetermined time, or a signal which means that all slaves such as in particular the EEPROM, may only listen, but not speak. In an organization with a memory_enable line, the latter may be clamped to render the memory unresponsive. In similar manner, certain bus protocols will be put out of action by particular current levels or patterns.

A third realization is that the microprocessor sends wrong addresses to the EEPROM, so that unintended data is read out, or rather, simulates wrong data as emanating from the EEPROM. The latter can be done, if the bus cycle allows the microprocessor to prevail in time on expectable actions by the external device, so that the microprocessor information comes earlier. In both situations, the external device gets information that is useless for its actual purpose.

A fourth realization is that the processor scrambles the transmission by the EEPROM, by transmitting information that coincides in time with the EEPROM data. The I2C bus organization offers a particular advantageous functionality therefor, in that one data bit value is always referent to the other, if the two coincide. In fact, I2C bus arbitration is based on just this feature.

The four measure may be taken in combination. For example, first the information is scrambled during a few memory cycles, and subsequently, power is removed. Also, two or more measures can be taken simultaneously. An extra feature would be, that the taking of one of the above blocking measures also causes to store a reference thereto in memory; this reference would then be read out and at subsequent operational or power-up sessions communicated by sound or image, which would make the rightful holder report immediately to the authority in question, thereby avoiding financial damage.

I claim:

1. A method for protecting against EEPROM-directed intrusion into a mobile communication device that carries EEPROM memory means and processor means that are interconnected via an electrical interface, said method comprising:

detecting an incipient powering operation of said device;
   through said microprocessor means detecting an external interfacing master trying to fraudulently access said EEPROM memory means through said electrical interface;
   upon said detecting, undertaking by said microprocessor means a protecting measure for blocking subsequent reading of said EEPROM means by said external interfacing master.

2. A method as claimed in claim 1, wherein said measure includes initiating a powering down routine.

3. A method as claimed in claim 1, wherein said measure includes disabling said interface through one or more appropriate voltage or current levels or patterns.

4. A method as claimed in claim 1, wherein said measure comprises simulating erroneous EEPROM data or addresses through said microprocessor means.

5. A method as claimed in claim 1, wherein said measure includes amending EEPROM-outputted information through a scrambling procedure.

6. A method as claimed in claim 1, wherein said measure includes storing a reference in on-board memory, which reference at a subsequent power-up session is communicated to a user.

7. A mobile communication device comprising:

EEPROM memory means and processor means that are interconnected via an electrical interface;

detecting means for detecting an incipient powering operation of said device, and in said microprocessor means while powered, detecting an external interfacing master trying to fraudulently access said EEPROM memory means through said electrical interface;

protecting means for protecting said device against EEPROM memory means-directed intrusion, said protection means being fed by said detecting means for undertaking a protecting measure that disables reading of said EEPROM memory means by said external interfacing master.

8. A device as claimed in claim 7, wherein said protecting means include trigger means for initiating a powering down routine.

9. A device as claimed in claim 7, wherein said protecting means include a disabling generator connected to said interface for generating one or more appropriate voltage or current levels or patterns.

10. A device as claimed in claim 7, wherein said protecting means comprise further generator means for generating erroneous EEPROM data or addresses on an output of said microprocessor means.

11. A device as claimed in claim 7, wherein said protecting means include amending means for amending EEPROM-outputted information through a scrambling procedure.

12. A device as claimed in claim 7, wherein said electrical interface is a bus.

* * * * *